(12) United States Patent
Beckmann et al.

(10) Patent No.: US 7,769,020 B2
(45) Date of Patent: Aug. 3, 2010

(54) METHOD FOR THE ESTABLISHMENT OF A COMMUNICATION LINK, AND COMMUNICATION SYSTEM

(75) Inventors: Mark Beckmann, Braunschweig (DE); Achim Luft, Braunschweig (DE); Holger Schmidt, Braunschweig (DE)

(73) Assignee: Siemens Aktiengesellschaft, Munich (DE)

( * ) Notice: Subject to any disclaimer, the term of this patent is extended or adjusted under 35 U.S.C. 154(b) by 857 days.

(21) Appl. No.: 10/557,391

(22) PCT Filed: May 13, 2004

(86) PCT No.: PCT/EP2004/050784

§ 371 (c)(1),
(2), (4) Date: Oct. 17, 2006

(87) PCT Pub. No.: WO2004/102921

PCT Pub. Date: Nov. 25, 2004

(65) Prior Publication Data

US 2007/0025358 A1    Feb. 1, 2007

(51) Int. Cl.
*H04L 12/56* (2006.01)
(52) U.S. Cl. .................. 370/395.21; 370/400
(58) Field of Classification Search ............ None
See application file for complete search history.

(56) References Cited

U.S. PATENT DOCUMENTS

| | | | | |
|---|---|---|---|---|
| 5,666,348 A * | 9/1997 | Thornberg et al. | ......... | 370/230 |
| 6,421,674 B1 * | 7/2002 | Yoakum et al. | ............... | 707/10 |
| 6,977,996 B1 * | 12/2005 | Brothers et al. | ........ | 379/114.05 |
| 7,110,393 B1 * | 9/2006 | Tripathi et al. | .............. | 370/352 |
| 7,227,865 B2 * | 6/2007 | Shaheen et al. | ........ | 370/395.21 |
| 2002/0120749 A1 * | 8/2002 | Widegren et al. | ........... | 709/227 |
| 2003/0154400 A1 * | 8/2003 | Pirttimaa et al. | ............ | 713/201 |
| 2004/0071090 A1 * | 4/2004 | Corson et al. | ................ | 370/244 |
| 2004/0205190 A1 * | 10/2004 | Chong et al. | ................. | 709/225 |
| 2004/0255039 A1 * | 12/2004 | Honeisen | .................... | 709/230 |

FOREIGN PATENT DOCUMENTS

| WO | WO 00/79756 | 12/2000 |
|---|---|---|
| WO | WO 02/067533 | 8/2002 |

OTHER PUBLICATIONS

XP-002143545—Moh M. et al. "Mobile IP telephony: mobility support of SIP" Proceedings of the International Conference on Computer Communications and Networks, Oct. 11, 1999 pp. 554-559.

* cited by examiner

*Primary Examiner*—Chirag G Shah
*Assistant Examiner*—Daniel Mitchell
(74) *Attorney, Agent, or Firm*—King & Spalding L.L.P.

(57) ABSTRACT

The disclosure relates to a method for establishing a communication link between a first communication terminal and a second communication terminal. According to the inventive method, the communication link is achieved by means of interconnected network elements, selected network elements being authorized to trigger releasing of the communication link.

12 Claims, 3 Drawing Sheets

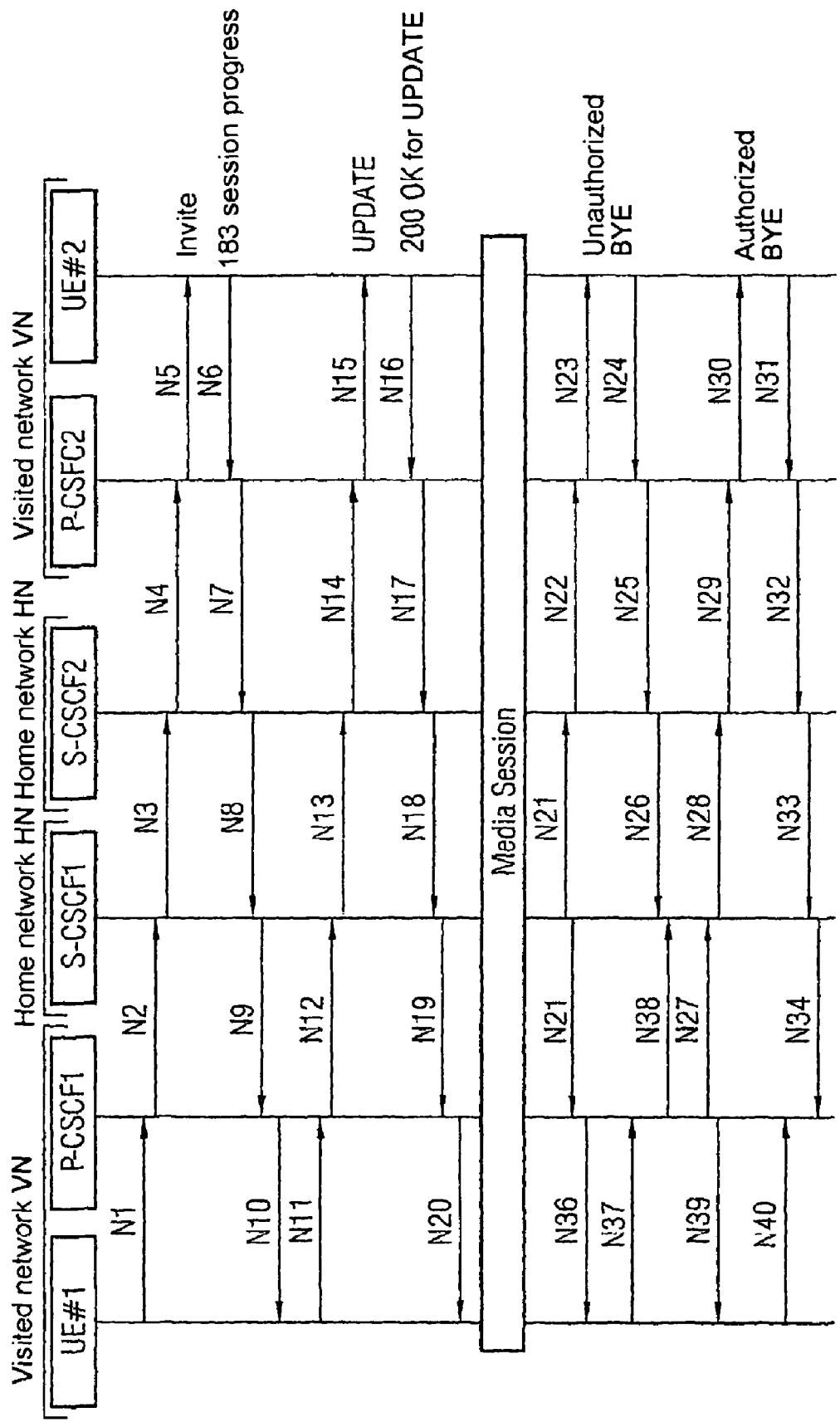

METHOD FOR THE ESTABLISHMENT OF A COMMUNICATION LINK, AND COMMUNICATION SYSTEM

FIELD OF TECHNOLOGY

The present disclosure relates to a method for the establishment of a communication link between a first communication terminal and a second communication terminal, with the communication link being implemented by means of interconnected network elements, and a corresponding communication system, particularly a UMTS.

BACKGROUND

The headlong spread of mobile communication has in recent years led to the development of a number of improved radio transmission methods. To integrate the advantages of the Internet into the world of mobile communication, a Session Initiation Protocol (SIP), as it is called, was proposed, which is what is known as an "Application Layer Control Protocol", i.e. a signaling protocol for establishing, modifying and terminating multimedia sessions. These multimedia sessions, can, for example, include multimedia conferences, Internet-telephone links (Voice over IP) and similar applications. By means of SIP, users can be invited, or added to, existing sessions and the composition of the multimedia session can be changed. The main capabilities of SIP are address allocation or address mapping, the localization of the called user and the diversion of connections. An SIP session in this case is usually realized between two communication terminals, also called user entities UE, with the interposition of several interconnected network elements, (e.g., proxies) being realized.

SIP was chosen by 3GPP as a signaling protocol for the IP Multimedia Call Network Subsystem (IMS). According to the current 3GPP specification, an SIP session can also be established or terminated by network elements (proxies), such as the P-CSCF, S-CSCF, MGCF or AS, within the IP multimedia core network subsystem [1], [2], [3] referenced at the end of the present text. The cause of this session termination by the P-CSCF can, for example, be the interruption of the radio link of the UE to the UTRAN (out of coverage). The S-CSCF ends the SIP session between the UEs because of a depleted pre-paid account of one of the terminals or for administrative reasons (see [1]).

However, the problem with this is that the SIP protocol specified in the Internet Engineering Task Force (IETF), and used by 3GPP in the IMS and adapted to this [purpose, the use of end-to-endprotocols. The control of the session is, by definition, in the logic units between which they are established. These logic units are known as user agents (UA), with these being distinguished as user agent clients (UAC) or user agent servers (UAS) depending on whether they transmit an SIP request or respond to a corresponding request with an SIP response (see [4]). Both logic units, UAC and UAS, are contained in a UE. Hence in accordance with the SIP protocol standard (IETF version), only the UAs can end an SIP session. This impedes the integration of the SIP protocol in mobile radio systems because this integration, as explained above, requires not only AUS, i.e. not only communication terminals, but also proxies as network elements, to be able to trigger a communication link.

FIG. 1 shows the known SIP signaling messages in the IMS during a termination of the SIP session initiated by P-CSCF, in a case where the radio link between the UE and UA and the UTRAN was broken (out of coverage) (see [1], FIG. 5.26*a*).

As can be seen in this illustration, the session is established by the P-CSCF by means of the message designated by "hangup". Hangup in this case stands for the transmission of the BYE request as it is known. The BYE message serves to identify the session to the P-CSCF and to indicate to the UE/UA that this session is to be terminated. Consequently, the UE or UA confirms, by means of the 200 OK message, the PSCF, the termination of the SIP session and then releases the PDP context, i.e. the data link to the UTRAN/CN on which the data of the media session is being transmitted. Further details are given in [1] chapter 5.10.3.1.1 (see also [2] chapter 8).

According to the prior art, a network element, e.g. the P-CSCF, thus terminates the SIP session. Accordingly, the UA has no control over who terminates the session or what proxy is entitled to do so. The UA functions purely as an "instruction receiver". This deviating functionality of the standard SIP (3GPP version) adapted from 3GPP was deprecated by the IETF. According to the present state of the art, an integration of the SIP protocol into the 3GPP standard is not possible, at least not with the agreement of the IETF.

SUMMARY

A system and method is disclosed for establishing a communication link between a first communication terminal and a second communication terminal that enables, under the control of a terminal, the triggering of the release of a link by a network element that realizes the link.

In accordance with an exemplary embodiment, selected network elements are authorized to trigger a release of the communication link.

Communication terminals can particularly be all communication terminals that can be the start or destination of an SIP session. An example of a communication terminal is a mobile telephone, particularly a UMTS mobile telephone. However, in the context of the invention a UA, a UAS, or a UAC can also be regarded as a communication terminal.

A communication link in this case also includes packet-switched communication links. An invite message that is transmitted over network elements can preferably be changed by any network element and can then be passed on to the next network element.

Changed invite messages, response messages or update messages can in this case also be designated as invite messages.

The present disclosure is generally based on the concept that not every network element, for example not every proxy, can release the link, e.g. a session, or trigger its release. In this way, for example, by means of an authorization check in a communication terminal, the control of the session termination can be achieved in the communication terminal, such as the UA, in conformity with the IETF. This means that network elements, such as proxies, can trigger the ending of a communication (session) but the final release of the link is still under the control of a communication terminal.

The present disclosure also illustrates a method for dealing with network elements, also referred to in the following as proxies, that are authorized to end an SIP session between UAs under another exemplary embodiment. The authorizations to terminate an SIP session can in this case be advantageously given by the UAs. The requirement of the IETF that the UAs have control over the established session is therefore taken into account. This property can, however, be restricted by a corresponding configuration and adaptation of the method, in order to meet the 3GPP-specific requirements. These requirements differ from those of the IETF in that the UMTS mobile radio network operators would like to have the maximum possible control over the SIP sessions operated in their network, i.e. in their IMS/CN. This requirement for a control of the SIP session by the network is directly opposed to the principle of the IETF for a UA-controlled SIP session.

The present disclosure provides for the transmission of an invite message from the first communication device via interconnected network elements, particularly on the signaling path, to the second communication terminal during the establishment of the communication link, and for an identification character of the network elements that require authorization for the triggering of a release of the communication link to be entered in the invite message. Information is thus entered in an invite message that signals the communication terminals regarding which network elements request authorization to release a link or to initiate release of a link.

Preferably, the method is thus characterized by the fact that the proxies, located on the signaling path between the UAs, indicate to the UAs during the session establishment whether they wish to receive the authorization to end the SIP session. For this purpose, they insert, particularly in a corresponding header field of a message or of an INVITE message, an information element that identifies it (SIP URI or SIPS URI) and indicates that the specified proxy wishes to be authorized to end the SIP session. The recipient of the INVITE message i.e. the UAS, can then check the entries in the relevant header field. Finally, the UAS can send a response, e.g. a "183 Session in Progress" message to the UAC. This message can also include a copy of the corresponding header field of the INVITE message. The UAS can, of course, delete the entries of individual proxies that are not accepted by it as session-terminating proxies. This decision can be made by the UAS, e.g. with the aid of specified criteria, a list comparison and/or by means of a configuration by the user. The identification of the authorized network elements can in this case also be stored in a subscriber identification module (SIM) within the communication terminal. After receipt of this response, that can at least run on all the proxies in the list not yet revised by the UAS, the UAC can check the list of proxies that wish to receive authorization to end the SIP session and that were accepted by the UAS. If at least one listed proxy is not accepted by the UAC, the UAC can transmit a correspondingly reduced list of proxies to the UAS in a further message. In this way, at least all the proxies listed in the list not yet revised by the UAC can be run through. The UPDATE method (see [6]), that is an extension of reference [4], can, for example, be used to transmit this list. As part of the handling of proxies, multiple messages can be exchanged between the UAs until agreement is reached between the UAs. If no agreement can be reached, the session termination can be aborted. The use of a method of this kind means that the decision as to what proxy is authorized to terminate the session lies finally with the UAs.

DETAILED DESCRIPTION OF THE DRAWINGS

The various objects, advantages and novel features of the present disclosure will be more readily apprehended from the following Detailed Description when read in conjunction with the enclosed drawings, in which:

FIG. 3 illustrates a diagram of the termination of an SIP session initiated by a network P-CSCF under another exemplary embodiment.

DETAILED DESCRIPTION

Figure 1:
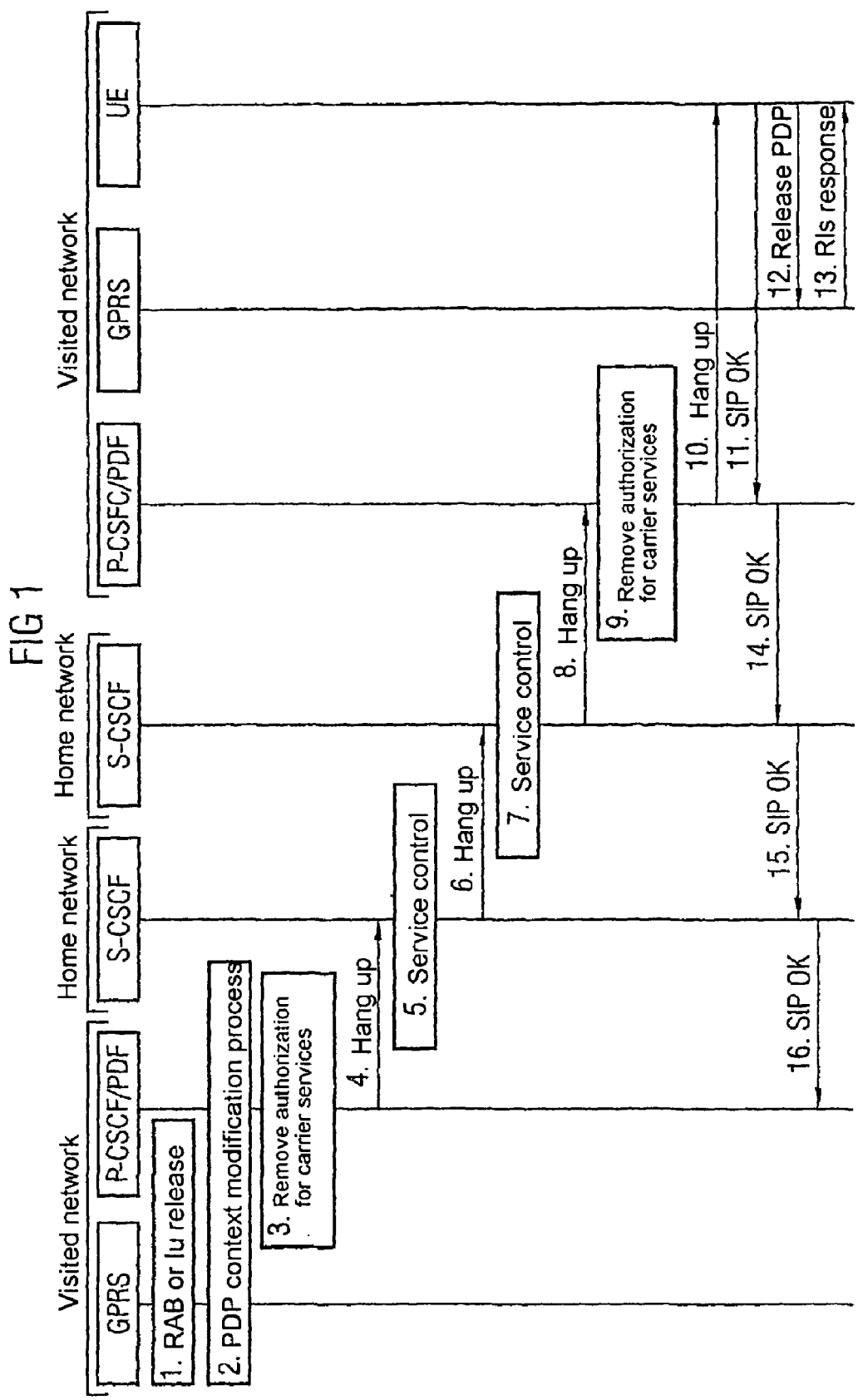
FIG. 1 illustrates a conventional diagram of the termination of an SIP session initiated by a network P-CSCF, after the radio link between the UE and UTRAN has been discontinued.
Figure 2:
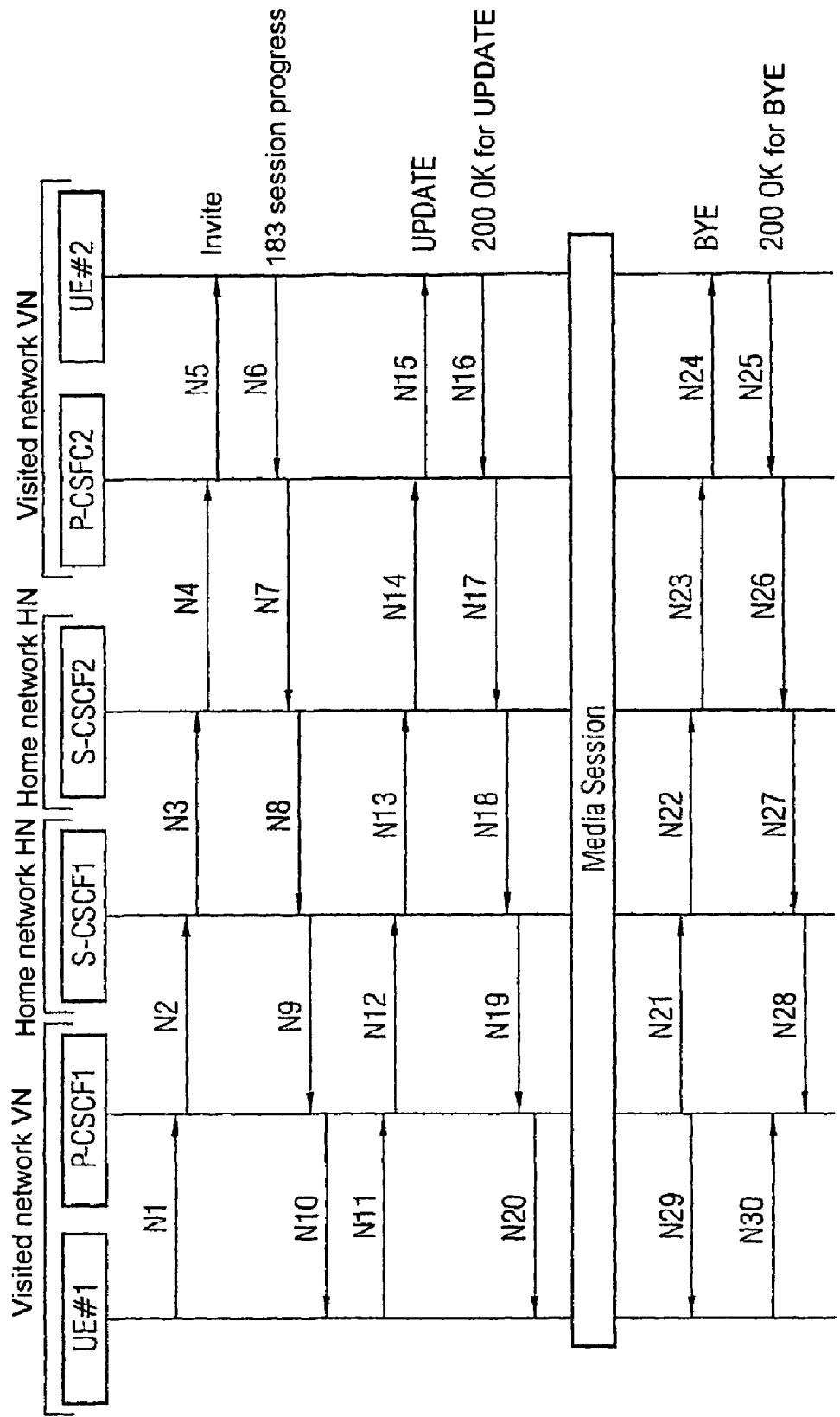
FIG. 2 illustrates a diagram of the termination of an SIP session initiated by a network P-CSCF under an exemplary embodiment.

In the following exemplary embodiment, a new SIP header is introduced to perform the disclosed methods. The header is preferred to as a "NI-BYE-Permit". FIG. 2 shows the SIP signaling messages in the IMS for a session establishment and termination. FIG. 2 thus includes the handling by the UAs of the proxies authorized for the session termination. It is assumed under the examples that the UAs are subject to no restrictions with regard to the choice of the IMS proxies. Such a restriction could, for example, exist in that the UAs have to accept certain proxies and that these cannot be deleted from the NI-BYE-Permit header. Corresponding proxies, can, for example, be configured by the mobile radio network, by the mobile radio system or the mobile radio system operator or be specified by the user. It should be noted that only the SIP signaling messages will be discussed in the embodiment illustrated in FIG. 2.

Accordingly, the following is a description of the SIP messages in FIG. 2. The session establishment begins with the INVITE message designated N1.

INVITE sip:Holger@siemens.com SIP/2.0
Via: SIP/2.0/UDP UE1.web.com; branch=z9hG4bKnashds8
Max-Forwards: 70
To: Holger sip:Holger@siemens.com>
From: Mark sip:Mark@web.com>;tag=1928301774
Call-ID: a84b4c76e66710
CSeq: 314159 INVITE
Contact: sip:Mark@UE1.web.com>
Content-Type: application/sdp
Content-Length: 142

It is assumed that the P-CSCF1 of the VN wishes to have authorization to end the SIP session, so that it can insert the NI-BYE-Permit header and give its URI there. The P-CSCF1 also inserts a record-route header and also enters its URI there. All proxies listed in the record-route header are part of the SIP signaling path within the opened dialog between UE#1 and UE#2 (see [4]). This is a necessary precondition for the subsequent ending of the SIP session by the P-CSCF1. The message N2 ((changed) invite message) can thus be given as follows.

INVITE sip:Holger@siemens.com SIP/2.0
Via: SIP/2.0/UDP pcscf1.visited1.netbranch=z9hG4bKaaaaaa
Via: SIP/2.0/UDP UE1.web.com; branch=z9hG4bKnashds8
Max-Forwards: 69
NI-BYE-Permit: sip: pcscf1.visited1.net>
Record-Route: sip: pcscf1.visited1.net;1r>
To: Holger sip:Holger@siemens.com>
From: Mark sip:Mark@web.com>;tag=1928301774
Call-ID: a84b4c76e66710
CSeq: 314159 INVITE
Contact: sip:Mark@UE1.web.com>
Content-Type: application/sdp
Content-Length: 142
(Mark's Sdp not Shown)

It is also assumed in this example that all proxies are entered in the NI-BYE-Permit header and thus wish to obtain authorization to end the SIP session. The messages designated N3, N4 and N5 (changed invite messages) do not differ essentially from each other, so that in this case only message N5 (changed invite message) is specified. This message contains, in the NI-BYE-Permit and record-route headers, the URIs of the proxies previously run through.

INVITE sip:Holger@siemens.com SIP/2.0
Via: SIP/2.0/UDP pcscf2.visited2.net;
branch=z9hG4bKdddddd
Via: SIP/2.0/UDP scscf2.home2.net; branch=z9hG4bKcccccc
Via: SIP/2.0/UDP scscf1.home1.net; branch=z9hG4bKbbbbbb
Via: SIP/2.0/UDP
pcscf1.visited1.net;branch=z9hG4bKaaaaaa
Via: SIP/2.0/UDP UE1.web.com; branch=z9hG4bKnashds8
Max-Forwards: 66
NI-BYE-Permit: sip:pcscf2.visited2.net>, sip: scscf2.home2.net>, <sip:scscf1.home1.net>, sip: pcscf1.visited1.net>
Record-Route: sip:pcscf2.visited2.net,1r>, <sip: scscf2.home2.net,1r>, sip:scscf1.home1.net;1r>,
sip: pcscf1.visited1.net;1r>
To: Holger sip:Holger@siemens.com>
From: Mark sip:Mark@web.com>;tag=1928301774
Call-ID: a84b4c76e66710
CSeq: 314159 INVITE
Contact: sip:Mark@UE1.web.com>
Content-Type: application/sdp
Content-Length: 142
(Mark's Sdp not Shown)

The UE#2 or the UAS now checks the URIs in the NI-BYE-Permit header. It is now assumed that the UAS S-CSCF1 is not accepted as a session-ending proxy. The UAS therefore deletes the URI of the S-CSCF1 from the NI-BYE-Permit header and sends the message N6, that can be in the form of a response message or also as a particularly changed invite message, with the help of the Via header to the UAC:

SIP/2.0 183 Session Progress
Via: SIP/2.0/UDP pcscf2.visited2.net;
branch=z9hG4bKdddddd
Via: SIP/2.0/UDP scscf2.home2.net; branch=z9hG4bKcccccc
Via: SIP/2.0/UDP scscf1.home1.net; branch=z9hG4bKbbbbbb
Via: SIP/2.0/UDP
pcscf1.visited1.net;branch=z9hG4bKaaaaaa
Via: SIP/2.0/UDP UE1.web.com; branch=z9hG4bKnashds8
NI-BYE-Permit: sip:pcscf2.visited2.net>, sip: scscf2.home2.net>, <sip: pcscf1.visited1.net>
Record-Route: sip:pcscf2.visited2.net,1r>, <sip: scscf2.home2.net,1r>, sip:scscf1.home1.net;1r>,
sip: pcscf1.visited1.net;1r>
To: Holger sip:Holger@siemens.com>;tag=21111972
From: Mark sip:Mark@web.com>;tag=1928301774
Call-ID: a84b4c76e66710
CSeq: 314159 INVITE
Contact: sip:Holger@UE2.siemens.com>
Content-Type: application/sdp
Content-Length: 142

The 183 session progress report, that can also be particularly in the form of a changed invite message, runs on the signaling path to the UAC via all the proxies listed in FIG. 2. These messages do not differ substantially from message N6, so that they are not repeated here. Each proxy checks the entries in the NI-BYE-Permit header. If its URI is still contained there, the corresponding proxy knows that it was accepted by the UAS. If its URI is no longer contained, as is the case in this example for the S-CSCF1, the corresponding proxy then knows that it was not accepted by the UAS and therefore may not end the session between the UAs. The list of proxies accepted by the UAS is received by the UAC with message N10 (changed invite message or response message). The UAC checks the NI-BYE-Permit header. It is further assumed in this example of an that the UAC, in addition to the S-CSCF1 does not accept the P-CSCF2 as a session-ending proxy. The UAC therefore sends an updated list of proxies, by means of messages N11-N15, also as an especially changed invite message, that no longer contains the P-CSCF2 to the UAS via the proxies given in the record route:

UPDATE Holger@UE2.siemens.com SIP/2.0
Via: SIP/2.0/UDP UE1.web.com; branch=z9hG4bKlmaa99
Max-Forwards: 70
NI-BYE-Permit: sip:scscf2.home2.net>, sip: pcscf1.visited1.net>
Route: sip: pcscf1.visited1.net;1r>, sip:scscf1.home1.net; 1r>, <sip:scscf2.home2.net,1r>, sip:pcscf2.visited2.net,1r>
To: Holger sip:Holger@siemens.com>;tag=21111972
From: Mark sip:Mark@web.com>;tag=1928301774
Call-ID: a84b4c76e66710
CSeq: 314160 UPDATE
Contact: sip:Mark@UE1.web.com>
Content-Type: application/sdp
Content-Length: 142

This message passes through all the proxies given in the route header, so that the P-CSCF2 knows, by means of the NI-BYE-Permit header, that it is no longer authorized to end the session between the UAs. In this way, the S-CSCF2 and the P-CSCF1 also know that their URI continues to be contained in the NI-BYE-Permit header. After receipt of message N15, the UAS checks the new proposal of the UAC in the NI-BYE-Permit header. It is assumed that the UAS accepts this proposal and confirms it by means of message N16:

SIP/2.0 200 OK
Via: SIP/2.0/UDP pcscf2.visited2.net;
branch=z9hG4bKddddd2
Via: SIP/2.0/UDP scscf2.home2.net; ranch=z9hG4bKccccc2
Via: SIP/2.0/UDP cscf1.home1.net; branch=z9hG4bKbbbbb2
Via: SIP/2.0/UDP
pcscf1.visited1.net;branch=z9hG4bKaaaaa2
Via: SIP/2.0/UDP UE1.web.com; branch=z9hG4bKlmaa99
NI-BYE-Permit: sip:scscf2.home2.net>, sip: pcscf1.visited1.net>
To: Holger sip:Holger@siemens.com>;tag=21111972
From: Mark sip:Mark@web.com>;tag=1928301774
Call-ID: a84b4c76e66710
CSeq: 314160 UPDATE
Contact: sip:Holger@UE2.siemens.com>
Content-Type: application/sdp
Content-Length: 142
(Holger's SDP not shown)

The session termination (signaling messages are not completely contained in FIG. 2) in accordance with the method described here for managing proxies authorized to terminate SIP sessions, and Holger (UE#2) and Mark (UE#1) exchange multimedia data with the format which they have agreed for the exchange of SDP messages. FIG. 2 also shows the termination of the SIP session by the P-CSCF1 authorized to do so.

In the alternate example, no new header is introduced to realize the disclosed method. In this particularly advantageous example, the record-route header is expanded in order to realize the method. FIG. 3 shows a typical signaling pattern with the aid of which the expansion of the record-route header is explained. The same assumptions also apply as in the first example of FIG. 2. It should be noted that this example of an embodiment differs from the embodiment of FIG. 2 only in the absence of the NI-BYE-Permit header and the expanded record-route header.

The message N1 for establishing the session does not change when the record-route header is used, i.e. it is identical to message N1 in the first example of an embodiment. It is further assumed that the P-CSCF1 of the VN wishes to obtain the authorization to end the SIP session. To do this, this proxy inserts a record-route header in the INVITE message so that for future requests it continues to be part of the SIP signaling path (see [4] and FIG. 2). The record-route header is expanded by an information element per entry, i.e. per URI. This field contains the value NI-BYE-YES if the corresponding proxy wishes to obtain the authorization to terminate the session. If it does not want this, the information element is advantageously not inserted. The permanent transmission of this element is also possible. In this case, a NI-BYE-NO must then be transmitted. The message N2 can thus be given as follows:

INVITE sip:Holger@siemens.com SIP/2.0
    Via: SIP/2.0/UDP pcscf1.visited1.net;branch=z9hG4bKaaaaaa
    Via: SIP/2.0/UDP UE1.web.com; branch=z9hG4bKnashds8
    Max-Forwards: 69
    Record-Route: sip: pcscf1.visited1.net;1r>; NI-BYE-YES
    To: Holger sip:Holger@siemens.com>
    From: Mark sip:Mark@web.com>;tag=1928301774
    Call-ID: a84b4c76e66710
    CSeq: 314159 INVITE
    Contact: sip:Mark@UE1.web.com>
    Content-Type: application/sdp
    Content-Length: 142
    (Mark's Sdp not Shown)

It is again assumed that all proxies wish to be authorized to end the SIP session. The messages designated N3, N4 and N5 do not differ essentially from each other, so that only message N5 is given here:

INVITE sip:Holger@siemens.com SIP/2.0
    Via: SIP/2.0/UDP pcscf2.visited2.net; branch=z9hG4bKdddddd
    Via: SIP/2.0/UDP scscf2.home2.net; ranch=z9hG4bKcccccc
    Via: SIP/2.0/UDP cscf1.home1.net; branch=z9hG4bKbbbbbb
    Via: SIP/2.0/UDP pcscf1.visited1.net;branch=z9hG4bKaaaaaa
    Via: SIP/2.0/UDP UE1.web.com; branch=z9hG4bKnashds8
    Max-Forwards: 66
    Record-Route: sip:pcscf2.visited2.net,1r>; NI-BYE-YES, <sip:scscf2.home2.net,1r>; NI-BYE-YES, sip:scscf1.home1.net;1r>; NI-BYE-YES, <sip:pcscf1.visited1.net;1r>; NI-BYE-YES
    To: Holger sip:Holger@siemens.com>
    From: Mark sip:Mark@web.com>;tag=1928301774
    Call-ID: a84b4c76e66710
    CSeq: 314159 INVITE
    Contact: sip:Mark@UE1.web.com>
    Content-Type: application/sdp
    Content-Length: 142
    (Mark's Sdp not Shown)

The UE#2 or the UAS checks, in accordance with the embodiment, the URIs in the record-route header. It is now assumed that the UAS does not accept the S-CSCF1 as a possible session-ending proxy. Therefore, the UAS deletes the "NI-BYE-YES" information element of the S-CSCF1 from the record-route header and sends message N6 to the UAC with the aid of the VIA headers. Alternatively, the UAS can also logically set the information element to "not accepted", i.e. send back "NI-BYE-NO". The first method mentioned here has the advantage compared to this message that less signaling data has to be transferred.

SIP/2.0 183 Session Progress
    Via: SIP/2.0/UDP pcscf2.visited2.net; branch=z9hG4bKdddddd
    Via: SIP/2.0/UDP scscf2.home2.net; ranch=z9hG4bKcccccc
    Via: SIP/2.0/UDP cscf1.home1.net; branch=z9hG4bKbbbbbb
    Via: SIP/2.0/UDP pcscf1.visited1.net;branch=z9hG4bKaaaaaa
    Via: SIP/2.0/UDP UE1.web.com; branch=z9hG4bKnashds8
    Record-Route: sip:pcscf2.visited2.net,1r>; NI-BYE-YES, <sip:scscf2.home2.net,1r>; NI-BYE-YES, sip:scscf1.home1.net;1r>, sip:pcscf1.visited1.net;1r>; NI-BYE-YES
    To: Holger sip:Holger@siemens.com>;tag=21111972
    From: Mark sip:Mark@web.com>;tag=1928301774
    Call-ID: a84b4c76e66710
    CSeq: 314159 INVITE
    Contact: sip:Holger@UE2.siemens.com>
    Content-Type: application/sdp
    Content-Length: 142
    (Holger's Sdp not Shown)

The 183 session progress report, also called the "specifically changed invitemessage", runs on the signaling parts to the UAC via all the proxies listed in FIG. 3. These messages do not differ essentially from message N6, so that they are not given here. Each proxy checks the entries in the record-route header. If the "NI-BYE-YES" information element is still contained therein, the corresponding proxy knows that it was accepted by the UAS. If this information element is no longer contained behind its URI, as is the case in this example for S-CSCF1, the proxy then knows that it was not accepted by the UAS and therefore may not end the session between the UAs. The list of proxies accepted by the UAS is received from the UAC with the message N10. The UAC then checks the record-route header. It is also assumed in this example of an embodiment that the UAC accepts the P-CSCF2 in addition to the S-CSCF1 as a proxy that does not end sessions. The UAC therefore sends an updated list of proxies, by means of N11-N15, that the P-CSCF2 no longer contains, to the UAS via the proxies given in the record-route:

UPDATE Holger@UE2.siemens.com SIP/2.0
    Via: SIP/2.0/UDP UE1.web.com; branch=z9hG4bKlmaa99
    Max-Forwards: 70
    Record-Route: sip:pcscf2.visited2.net,1r>, <sip:scscf2.home2.net,1r>; NI-BYE-YES, sip:scscf1.home1.net; 1r>, sip:pcscf1.visited1.net;1r>; NI-BYE-YES
    To: Holger sip:Holger@siemens.com>;tag=21111972
    From: Mark sip:Mark@web.com>;tag=1928301774
    Call-ID: a84b4c76e66710
    CSeq: 314160 UPDATE
    Contact: sip:Mark@UE1.web.com>
    Content-Type: application/sdp Content-Length: 142
(Marks's Sdp not Shown)

This message passes through all the proxies given in the route header, so that the P-CSCF2 knows by means of the record-route header that it no longer authorized to end the session between the UAs. In this way, the S-CSCF2 and the P-CSCF1 detect that the NI-BYE-YES information element is still present behind their URI, so that they continue to be authorized to end the session. After receipt of message N15, the UAS checks the new proposal of the UAC, contained in the record-route header. It is assumed that the UAS accepts this proposal and confirms it by means of message N16:

SIP/2.0 200 OK
Via: SIP/2.0/UDP pcscf2.visited2.net; branch=z9hG4bKddddd2
Via: SIP/2.0/UDP scscf2.home2.net; ranch=z9hG4bKccccc2
Via: SIP/2.0/UDP cscf1.home1.net; branch=z9hG4bKbbbbb2
Via: SIP/2.0/UDP pcscf1.visited1.net;branch=z9hG4bKaaaaa2
Via: SIP/2.0/UDP UE1.web.com; branch=z9hG4bKlmaa99
Record-Route: sip:pcscf2.visited2.net,1r>, <sip:scscf2.home2.net,1r>; NI-BYE-YES, sip:scscf1.home1.net; 1r>, sip:
pcscf1.visited1.net;1r>; NI-BYE-YES
To: Holger sip:Holger@siemens.com>;tag=21111972
From: Mark sip:Mark@web.com>;tag=1928301774
Call-ID: a84b4c76e66710
CSeq: 314160 UPDATE
Contact: sip:Holger@UE2.siemens.com>
Content-Type: application/sdp
Content-Length: 142
(Holger's Sdp not Shown)

The session establishment is concluded in accordance with the method described here for managing proxies authorized to terminate SIP sessions (signaling messages are not completely contained in FIG. 3) and Holger (UE#2) and Mark (UE#1) exchange multimedia data with the format which they have agreed for the exchange of SDP messages. FIG. 3 also shows the attempt, N21-23, by S-CSCF1 to end the session. Message N23 in this case can be given as follows:

BYE sip:Holger@UE2.siemens.com SIP/2.0
Via: SIP/2.0/UDP pcscf2.visited2.net; branch=z9hG4bKddddd3
Via: SIP/2.0/UDP scscf2.home2.net; ranch=z9hG4bKccccc3
Via: SIP/2.0/UDP cscf1.home1.net; branch=z9hG4bKbbbbb3
Via: SIP/2.0/UDP
pcscf1.visited1.net;branch=z9hG4bKaaaaa3
Max-Forwards: 70
Route: sip:scscf2.home2.net,1r>, sip:pcscf2.visited2.net, 1r>
To: Holger sip:Holger@siemens.com>;tag=21111972
From: Mark sip:Mark@web.com>;tag=1928301774
Call-ID: a84b4c76e66710
CSeq: 12 BYE
Content-Length: 0

Using the lowest, i.e. the first Via header inserted, the UAC (UE#2) detects the source of this message. The record-route header and the proxies authorized to end the SIP session are stored in the transaction state by the UAs (Note: The proxies of the IMS are all state-full proxies [4]). The UA therefore know which proxy is authorized to end the SIP session even if no record-route header is contained in the message. Consequently, the UAC does not accept the BYE message from the P-CSCF1 and sends an error message, i.e. a 4xx (401) message, in N24-N26, back to the P-CSCF1. The same applies to messages N35-N38 between P-CSCF1 and UE#1.

The P-CSCF1 then ends the SIP session between UE#1 and UE#2, in that it sends a BYE message to both UAs. This is very similar to message N23 so that no further details are given here. Using the Via header, the UAs detect the source of this BYE request, and a correlation with the information stored in the transaction state thus shows that the P-CSCF1 is authorized to end the session. Consequently, UE#1, with N40, and UE#2 with N31-N34, each send a 200 OK to the P-CSCF1. This ends the SIP session and the UEs release the (radio) resources used.

It should be understood that the various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

As part of this application, reference is made to the following documents:

[1] 3GPP TS 23.228: IP Multimedia Subsystem; Stage 2
[2] 3GPP TS 24.228: IP Multimedia Call Control Protocol based on SIP and SDP; Stage 3
[3] 3GPP TS 24.229: Signaling Flows for the IP Multimedia Call Control Protocol based on SIP and SDP; Stage 3
[4] RFC3261: SIP: Session Initiation Protocol
[5] WO 2002067533 A1: Closing a SIP active Session, Nokia
[6] RFC3311: The Session Initiation Protocol (SIP) UPDATE Method The following abbreviations are used in this application:

3GPP Third Generation Partnership Project

AS Application Server

CN Core Network

DRNC Drift RNC

GGSN Gateway GPRS Support Node

GMSC Gateway MSC

GSM Global System for Mobile Communications

HLR Home Location Register

HN Home Network

IETF Internet Engineering Task Force

IMS IP Multimedia CN Subsystem

MGCF Media Gateway Control Function

MSC Mobile Switching Center

P-CSCF Proxy CSCF

RAB Radio Access Bearer

RNC Radio Network Controller

S-CSCF Serving CSCF

SDP Session Description Protocol

SGSN Serving GPRS Support Node

SIP Session Initiation Protocol

SIPS URI Secure SIP URI

UA User Agent

UAC User Agent Client

UAS User Agent Server

UE User Equipment

UMTS Universal Mobile Telecommunication System

URI Uniform Resource Identifier

UTRAN Universal Terrestrial Radio Access Network

VLR Visitor Location Register

VN Visited Network

The invention claimed is:

1. A method for establishing a communication link between a first communication terminal and a second communication terminal, comprising:
   transmitting an invite message having identification elements from the first communication terminal to the second communication terminal when establishing the communication link, wherein the communication link comprises interconnected network elements;
   adding to the invite message first identification elements identifying at least a subset of the network elements that request to be authorized to release the communication link;
   at least one of the first and second communication terminals removing from the invite message one or more first identification elements corresponding to one or more particular network elements, such that the one or more particular network elements become unauthorized to trigger the release of the communication link; and
   executing release of the communication link by at least one network element assigned the identification element after removal of the one or more particular network elements.

2. The method according to claim 1, further comprising:
   assigning second identification elements to the network elements that are authorized to release the communication link being stored in the second communication terminal; and
   removing identification elements of the unauthorized network elements from the invite message.

3. The method according to claim 2, wherein the invite message having removed identification elements is transmitted from the second communication terminal via the interconnected network elements to the first communication terminal.

4. The method according to claim 3, wherein the network elements are notified, by at least one of the first and second communication device, regarding identification element that have been removed from the invite message.

5. The method according to claim 4, wherein the first identification elements are stored in the first communication terminal.

6. The method according to claim 2, wherein with the invite message having removed identification elements is transmitted from the first communication terminal to the second communication terminal via the interconnected network elements.

7. The method according to claim 6, wherein the network elements are notified, by at least one of the first and second communication device, regarding identification element that have been removed from the invite message.

8. The method according to claim 6, further comprising:
   executing a check in the second communication terminal to determine whether identification elements are entered in the invite message are different from the second identification elements stored in the communication terminal, and
   sending a confirmation message to the first communication terminal if no identification elements are entered in the invite message that are different from the second identification elements stored in the communication terminal.

9. The method according to claim 1, wherein the identification elements are entered in the message header of the invite message by at least one of the network elements.

10. The method according to claim 2, further comprising:
    storing the first identification elements are in the first communication terminal; and
    expanding the invite message by the identification elements of the authorized network elements.

11. The method according to claim 10, further comprising:
    storing the second identification elements in the second communication terminal; and
    expanding the invite message by the identification elements of the authorized network elements.

12. The method according to claim 11, further comprising:
    detecting if a release of the communication link is being executed by at least one network element assigned the identification element;
    executing a check in the first or second communication terminal to determine whether the network element triggering the release of the communication link is authorized to trigger the release of the communication link; and
    stopping the release of the communication link if the network element executing the release of the communication link is not authorized to trigger the release the communication link.

* * * * *

UNITED STATES PATENT AND TRADEMARK OFFICE
CERTIFICATE OF CORRECTION

PATENT NO.       : 7,769,020 B2
APPLICATION NO.  : 10/557391
DATED            : August 3, 2010
INVENTOR(S)      : Mark Beckmann et al.

It is certified that error appears in the above-identified patent and that said Letters Patent is hereby corrected as shown below:

Title page, [30] Please insert the Foreign Application Priority Data as follows:

--May 19, 2003..............(DE)................ 103 22 539.0--

Column 1, Line 4 of the issued grant needs correction: Please insert the following:

--CROSS REFERENCE TO RELATED APPLICATIONS

This application is a U.S. national stage application of International Application no. PCT/EP2004/050784, filed May 13, 2004, which designates the United States of America, and claims priority to German application no. 103 22 539.0, filed May 19, 2003, the contents of which are hereby incorporated by reference in its entirety.--

Signed and Sealed this

Twelfth Day of October, 2010

David J. Kappos
*Director of the United States Patent and Trademark Office*